3,626,731
AUTOMATIC CALIBRATION OF ROLLING MILL THICKNESS GAGING SYSTEM
William Jeuick, Bethlehem, Pa., assignor to Bethlehem Steel Corporation
Filed Mar. 18, 1970, Ser. No. 20,710
Int. Cl. B21b 37/00
U.S. Cl. 72—8                                             12 Claims

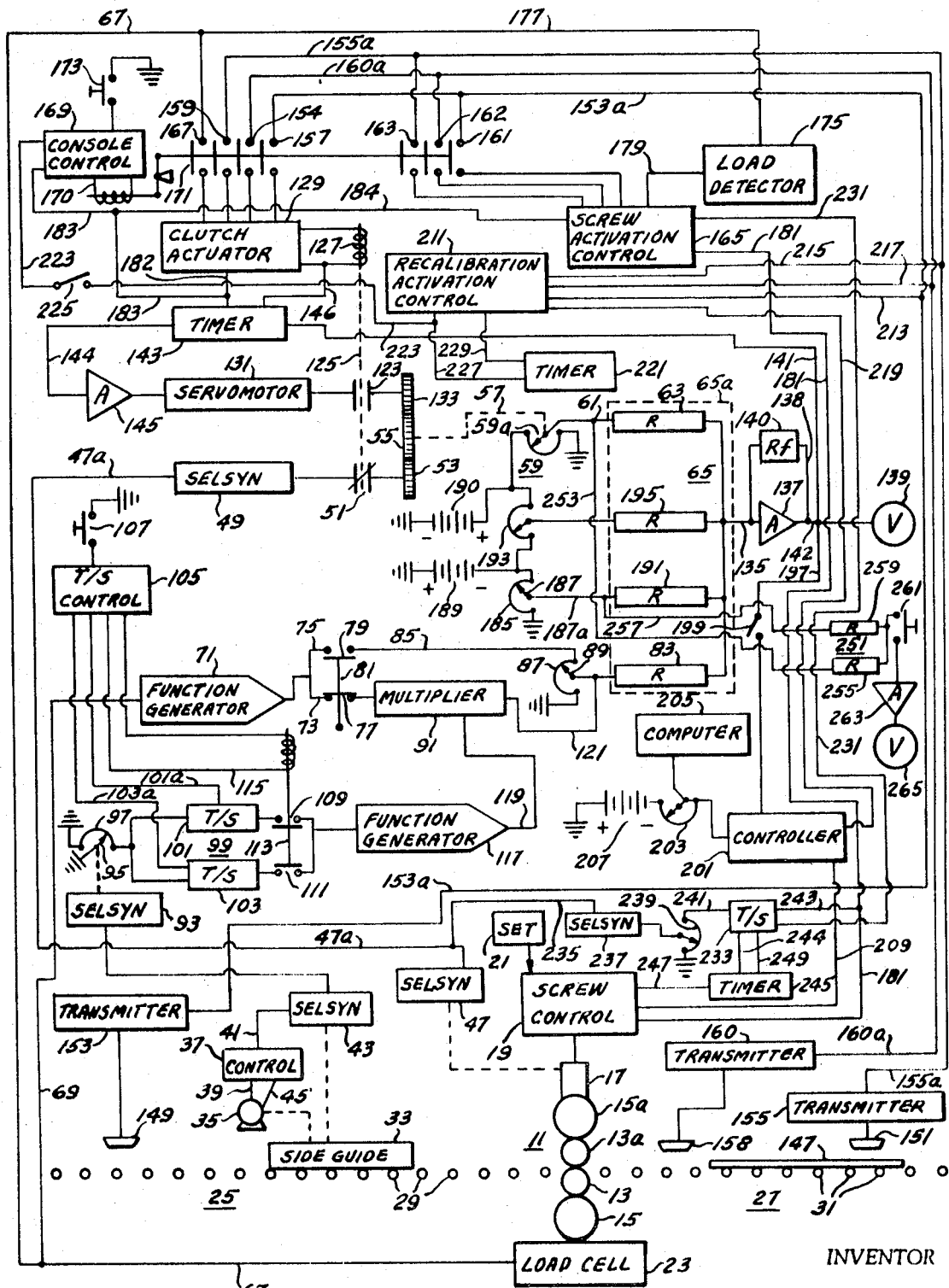

ABSTRACT OF THE DISCLOSURE

A rolling mill control system, which uses a load cell signal to determine the stretch of the mill under load, is periodically recalibrated to correct for drift by moving the work rolls into contact to establish the true zero setting that serves as the basis in the system for determining the correct gage of strip subsequently rolled. A biasing signal is provided during recalibration to relate, in a straight line relationship, the stretch of the mill structure to the load detected by the load cell in order to enable the recalibration to be accomplished quickly and without hunting in the system at any indicated below face position of the rolls.

BACKGROUND OF THE INVENTION

The present invention relates to rolling mill control systems incorporating load cell and screw position signals and more particularly to recalibration systems for such control systems.

Rolling mill control systems and gage indication systems are well known for measuring the gage of the strip passing through the rolling stands by determining the opening between the rolls in accordance with a signal from a mill screw detector that indicates the position of the turndown screws and thus the nominal position of the roll faces. Such systems customarily incorporate a signal from a load cell associated with the rolls of the rolling stand to measure the force between the rolls. This force signal is converted through the application of Hook's law into a representation of the stretch or yield of the mill stand as a whole and added to the signal from the mill screw position detector in accordance with the conventional load cell-screw position gaging system equation $h = S_0 + d$. In this equation $h$ equals the thickness, $S_0$ equals the unloaded roll opening and $d$ equals the mill stand deflection, to provide a representation of the actual opening between the rolls of the roll stand during passage of the strip therebetween and thus the gage of strip being rolled. The summated roll opening and rolling load signals can also be further summated algebraically with a signal representative of the desired strip gage in order to attain a gage error signal representative of the difference between the gage material actually rolled and the gage material desired. This signal can then be used to directly control the rolling stand or referred to for indirect control of the positioning of the rolls in the stand.

Since the gage indication provided by summated load cell and screw position signals is only an indirect indication of the actual gage of the strip it is subject to a number of errors due to mill heating and cooling, roll wear and other disturbances. The roll force occurring in a stand is, for instance, a function, among other things, of strip width and initial gage, percent reduction, temperature of both the strip and the mill, roll size, metallurgical composition of the strip and other quantities such as friction and the like which are difficult to measure or calculate.

It is necessary, therefore, in the use of such a control system that the system be rather frequently recalibrated so that a continuing accurate representation of the actual gage of metal being rolled can be maintained. Such recalibration can be accomplished in a variety of possible manners, both direct and indirect. Direct measurement can be accomplished by means of X-ray gages or flying micrometers or the like. These devices measure the actual gage of strip as it passes from the rolling stand or mill and if an error between the gage indication of the X-ray or flying micrometer and the load cell-screw position signal is detected it is assumed that the X-ray or other direct measurement signal is the correct signal and a biasing signal is provided to recalibrate the screw position signal and make it equal to the X-ray signal.

Recalibration of gage control systems by means of a flying micrometer or even by hand is inconvenient, time consuming and quite often inaccurate. Recalibration by an X-ray gage is not applicable when the metal strip is more than one and a half to two inches in thickness and, in addition, requires a complicated and expensive gage. Moreover, X-ray gages are sensitive instruments not well suited for the environment of hot mills. In reversing mills, for example, such gages are often struck and damaged by the strip passing through the mill.

Initial calibration of load cell-screw position type gage control systems before the beginning of rolling, particularly after the installation of new rolls in a heating stand, is quite frequently indirectly accomplished by bringing the rolls of the mill together to face or slightly below face to provide a zero reading. In some cases a strip of standard gage may be passed between the rolls as an alternate method of initial calibration. (No X-ray or similar type of calibration can, of course, be used where no metal has yet been rolled.) Later calibration, termed recalibration, in this manner, has not been practical between passes on modern high speed mills, however, because the passage of strip through the mill would have to be interrupted in order to allow sufficient time for the recalibration to proceed. This has been because it is almost impossible to determine when the rolls are positioned just at face and it has consequently been necessary to run the rolls below face until some particular load is generated between the rolls and then recalibrate the mill at this particular load.

Because a rolling mill is a massive structure, however, it is not possible to reach a given load condition quickly. If the mill screwdown mechanism is operated at high speed the particular desired loading condition may be passed so that the screwdown must be reversed and backed up to the desired load. Such "hunting" is not only time consuming and inefficient but also introduces inaccuracies due to hysteresis. If, on the other hand, the screwdown is operated slowly to creep up on the desired load without hunting there is insufficient time between passage of work pieces through the mill to reach the recalibration load without interrupting production.

The foregoing problems have been particularly troublesome on reversing mills where bars are rolled in close sequence and where the metal piece is often, at least in the initial stages of rolling, too thick for effective gaging by an X-ray or other radiation type gage. X-ray gages are, furthermore, so expensive and delicate that they are often uneconomical for use in reversing and particularly hot reversing mills.

In reversing mills also the metal pieces passing through the mill vary widely as to gage often both from one work piece to the next and between repeated passes of a work piece through the mill. Since a direct relationship between the yield of the mill and the load in the mill according to Hook's law holds true for most rolling mills over only a fairly narrow range of loads, it is particularly important that any calibration of the mill made by bringing the rolls together be made at some range in which a straight line relationship between the load between the rolls and the yield of the mill is true. The load on the mill thus must be accurately determined for effective calibration and the calibration attained is not always effective beyond these particular ranges of straight line relationship.

SUMMARY OF THE INVENTION

The foregoing difficulties have been obviated in accordance with the present invention in load cell-screw position type gage control systems by the provision of means for biasing or reforming the load cell signal in order to bring it into a straight line relationship with the yield of stretch of the mill over a very wide range of mill loads and mill yields in combination with means to periodically bring the rolls of the mill stand together and stop them at any position below face while a recalibration of the mill is expeditiously made. This combination enables the rolls of the mill stand to be brought quickly to any position below face and recalibration accomplished at the position in which the rolls stop without the necessity for hunting to attain a particular position of the rolls. Recalibration of the gage system is thus made practical at any time between passes of metal pieces through the mill.

BRIEF DESCRIPTION OF THE DRAWING

The single figure is a diagrammatic representation of an embodiment of a rolling mill gage control recalibration system according to applicant's invention.

DESCRIPTION OF THE PREFERRED EMBODIMENT

Shown in the figure is a reversing type rolling mill stand 11 having lower and upper work rolls 13 and 13a, respectively, and lower and upper backup rolls 15 and 15a, respectively. Upper work roll 13a and backup roll 15a are moved by means of screwdown mechanism 17, which is directly controlled by electrical screw control apparatus 19, and screw position setting means 21, which is usually located in the mill pulpit.

Under lower work roll 15 is load cell 23 which functions to detect the load between work rolls 13 and 13a. In some installations it may be more convenient to place such a load cell between the upper work roll 15a and the screwdown mechanism 17.

Roller tables 25 and 27 having power operated rollers 29 and 31, respectively, are located on the entry side and exit side, respectively, of reversing rolling stand 11. A pair of movable side guides 33, only one of which is shown, are located on both sides of roller table 25. Side guides 33 are movable horizontally toward and away from each other by motor 35, which is operated by a suitable electronic control 37 connected to motor 35 by control lead 39. Control 37 receives signals via lead 41 from selsyn transmitter 43 representative of the position of the side guides 33 and a signal representative of the load on the motor 35 via lead 45. When the side guides move against the side of a strip traveling between them the load on motor 35 increases sharply. This increase in motor load is detected by the control 37 and in response thereto control 37 either cuts off the current to motor 35 completely or considerably decreases it to prevent undue force being applied to the edges of the strip or plate on table 25. Such undue force would tend to deform the strip.

Selsyn transmitter 47 detects the position of screwdown mechanism 17 and transmits this as a position signal via lead 47a to selsyn receiver and actuator 49 which is connected through clutch mechanism 51 to gears 53 and 55 that, through a suitable mechanical linkage 57, shown in dotted lines, operates the contact of a screw position potentiometer 59. Potentiometer 59 supplies a signal, which is proportional to the position of screw mechanism 17, via lead 61 and resistor 63 into a summation circuit network 65, encompassed within dotted lines 65a on the figure. Potentiometer 59 constitutes an adjustable signal generating means to supply a positive signal to summation circuit network 65.

Load cell 23 directs a signal representative of the load between the rolls 13 of the rolling stand 11 via leads 67 and 69 to a suitable function-generator 71 which is preprogrammed to make the load cell signal substantially directly proportional to the stretch or yield of the rolling stand 11 at any conceivable normal working load within the stand 11. Reshaping of the load cell signal to provide a straight line relationship with the yield of the mill structure may be accomplished by the function generator 71, as is well known in the art, either by adding an extraneous correction signal to the load cell signal in a suitable summation network or by direct reshaping of the load cell signal to provide a substantially straight mill modulus curve within the function generator. The reshaped load cell signal is then applied alternatively via leads 73 or 75 through alternatively open or closed contacts 77 or 79 of gang switch 81 to summation circuit 65 through resistor 83, as hereinafter more fully disclosed.

In the closed position contact 79 of manually operated gang switch 81 directs a reshaped load cell signal over lead 85 to width correction potentiometer 87 from which the signal is tapped off through its movable contact 89 to resistor 83. Potentiometer 87 may be preset to allow for a correction of the load cell signal by a correction factor necessitated by the variation in width of material passing through the mill. There will tend to be greater flexion or bending of the rolls and thus a greater increase in the stretch of the mill for narrower material passing through the roll gap than for otherwise equivalent wider material passing through the roll gap. Potentiometer 87 allows the load cell signal to be corrected for an increased yield of the mill caused by the variation in flexion.

Contact 77 of gang switch 81 when closed as shown in the figure directs the reshaped load cell signal from function generator 71 to multiplier unit 91 which multiplies the signal by a suitable factor depending upon the width of the strip. The multiplication factor for multiplier 91 is derived as follows.

A signal initiated by the mill operator by closing control switch 107 is sent by lead 101a or 103a to track and store units 101 and 103. These units alternately handle tracking and storing, i.e. when one unit is tracking the other unit is storing, and vice versa. Upon a signal from the operator the unit which is tracking the movement of side guides 33, will cease tracking and store a signal indicative of the last position of the side guides. At the same time the other unit begins tracking the movement of the guides. By closing contact 109 or 111 the unit which has stored the last side guide position signal will direct this signal to function generator 117. Contacts 109 and 111 are closed by the action of solenoid circuit 115 operated by track and store control 105.

Function generator 117 is preprogrammed to provide a correction signal, appropriate to any given width of rolled material, via lead 119 to multiplier 91. Multiplier 91 multiplies the shaped load cell signal from function generator 71 by a multiplication factor appropriate for the particular width of strip material being rolled and directs the corrected signal via lead 121 to resistor 83 and summation circuit network 65. Ordinarily the signal from function generator 71 will be designed to represent the maximum width of material to be rolled, and function generator 117 provides a multiplication factor to correct for less than maximum widths of material.

In order to recalibrate the gage control system there is provided a second clutch 123 adjacent to clutch 51 and designed to be engaged alternatively with respect to clutch 51 by a suitable mechanical linkage denoted by dotted line 125 operated by a solenoid circuit 127 controlled by a clutch actuator control 129.

Clutch 123 connects servomotor 131 to gear 133 which engages with gear 55 to drive the movable contact 59a of screw position potentiometer 59 when clutch 123 is engaged and clutch 51 is disengaged.

Summation circuit 65 puts out a signal which is representative of the opening between the work rolls 13 of reversing stand 11. Since this signal is representative of the actual opening betwen the rolls, it is most desirable that the signal should be equivalent to zero when there is no opening between the rolls. The signal representative of the roll opening is directed by summation circuit 65 via lead 135 to operational amplifier 137 and then via lead 142 to a digital voltmeter type roll opening indicator 139 on which the exact roll opening, and thus the gage of metal passing through that opening, can be read at any given time. A resistance feedback circuit 138 with resistor 149 bypasses amplifier 137 in a conventional manner to enable proper amplification of the signal. Any suitable type of voltage indicating gage may, of course, be substituted for the digital voltmeter shown.

A branch lead 141 tapped off lead 142 after operational amplifier 137 also conducts the gage indication signal from lead 142 through timer 143 and via lead 144 to amplifier 145. Amplifier 145 directs the amplified signal to servomotor 131 which operates the gear train 133, 55 through clutch 123, when appropriate, to move the movable contact 59a of potentiometer 59 until a null or zero signal is obtained at the output of amplifier 137 when the rolls 13 and 13a are brought together during recalibration of the gage control system.

A timer switch in timer 143 is normally open. However, a lead 146 from the solenoid circuit 127 actuated by clutch actuator 129, hereinafter more fully described, leads to timer 143 to close the timer switch and set the timing interval to allow a signal to pass via lead 144 to amplifier 145 so long as the timer switch is closed. The cycle of timer 143 is arranged to provide normally for sufficient time for recalibration to occur between the passage of consecutive work pieces through the rolling stand.

Three work piece detectors 149, 151 and 158, which may conveniently comprise hot metal detectors, are arranged at varying distances from the rolling stand 11 above roller tables 25 and 27 respectively in position to detect the presence of metal work pieces such as hot metal plate 147. Detector 149 is positioned far enough in front of stand 11 to determine that no new work piece is immediately entering the rolling stand. Detector 151 likewise is positioned in a location far enough from the rolling stand to determine that the piece being rolled has actually left the rolling stand and is not merely temporarily positioned on one side of the stand about to be repassed through the stand. Detector 158 is positioned close to the rolling stand to detect any metal pieces close to or in stand 11. An additional smiilar detector, not shown, could be located in the vicinity of side guide 33 if desired.

Work piece detectors 149, 151 and 158 apply their detection signals to transmitters 153, 155 and 160 respectively. These transmitters are arranged to provide a signal when no signal is being received from their respective detectors. These signals from transmitters 153, 155 and 160 are directed through leads 153a, 155a and 160a via contacts 157, 154 and 159 respectively to clutch actuator control 129 and also via contacts 161, 162, and 163 respectively to a screw activation control 165. Also arriving at clutch actuator control 129 via contacts 167 and lead 67 is the load cell signal from load cell 23. A console control 169 is arranged to move gang switch 171 by actuation of solenoid circuit 170 to close contacts 167, 159, 154, 157, 163, 162 and 161 upon the closing of push button switch 173 by the mill operator to initiate operation of the recalibration cycle.

A load signal detector 175 is arranged to detect any load signal on branch lead 177 connected to lead 67. Load signal detector 175 may be set to provide a signal via lead 179 at any predetermined strength of load cell signal on branch lead 177. Upon proper activation of screw activation control 165 by the various signals leading into it the control 165 will provide a signal via lead 181 to screw control 19 which signal is effective to cause the control 19 to operate the screw mechanism and run the rolls of stand 11 toward each other until they touch.

A lead 182 from timer 143 to clutch actuator 129 and branch lead 183 to console control 169 provide signals effective upon the opening of timer 143 to cause the deactivation of solenoid circuit 127 of clutch actuator 129 to disengage clutch 123 and reengage clutch 51 and to cause console control 169 to de-energize solenoid circuit 170 and open switches 167, 159, 154, 157, 163, 162 and 161 halting all recalibration action.

Also associated with the summation circuit 65 to aid in recalibration is a so-called intercept potentiometer 185 which serves to provide a negative signal to the summation circuit network 65 so that negative values will not be obtained when the recalibration of the system is proceeding with the rolls positioned below face. The movable contact 187 of intercept potentiometer 185 picks up a negative signal from potentiometer 185 which is activated by the negative terminal of a power source 189, shown for convenience as a battery. The negative signal from potentiometer 185 is then applied to summation circuit 65 through resistor 191.

The positive side of a power source 190 shown also for convenience as a battery, is connected to the screw position potentiometer 59 and also to one side of a drift potentiometer 193. Drift potentiometer 193 is also connected at its opposte side to the negative terminal of power source 189 so that drift potentiometer 193 is provided with a negative voltage on one side and a positive voltage on the opposite side as is well known in the art. Drift potentiometer 193 is provided to occasionally make corrections in the summated signals of summation circuit 65 to provide correct gage signals. The corrections of the drift potentiometer are made to allow for factors which cannot be detected by bringing the rolls 13 of the rolling stand together to establish a zero reference position. Such undetectable factors may be of several types including particularly slight grooves worn into the rolls by the passage of the strip. Such grooves cannot be detected by bringing the rolls together because the unworn portions of the rolls initially contact each other and the rolls, except for the small amount of flattening which may take place, cannot then move any farther together thus causing the zero point to be determined at a point above the actual working face of the rolls. The actual gage of the strip is consequently taken with an X-ray gage, if one should happen to be available, or more frequently with a hand micrometer or the like and the gage error determined and converted into a suitable drift signal on potentiometer 193 and applied through resistor 195 to summation circuit 65.

During recalibration of the gaging system the positive screw position signal from potentiometer 59 and the positive or negative drift signal from potentiometer 193 are balanced against the negative intercept potentiometer signal from potentiometer 185.

The gage control system of the present invention is useful not only for the visual representation of an accurate, periodically recalibrated strip gage signal representing the gage of strip passing from a rolling mill to enable the operator to monitor the actual strip gage, but can also be effectively used for the direct control of the rolling operation. A scheme for the accomplishment of actual control of the screwdown 17 of rolling stand 11 is diagrammatically shown tapped off lead 142 in the figure. If it is necessary to activate the screw control with the gage signal from summation network 65, this signal after passing through amplifier 137 is applied through leads 142 and 197 and switch 199, which must, of course, be closed if a control function is to be had, to a controller 201, which may preferably be a three function controller such as shown and described in U.S. Patent 3,416,339 issued Dec. 17, 1968, to H. A. List. A gage reference potentiometer 203 may be adjusted to provide a signal representative of the gage of strip or plate which it is desired to make on each pass through the rolling stand 11. If only one pass is to be made this predetermined reference need be set only once for each workpiece or series of workpieces. However, if multiple passes are to be made with respect to a single work piece as on a reversing mill, suitable means to alter the desired gage prior to each new pass must be provided. Such preprogramming may be provided by a suitably programmed computer 205 shown diagrammatically arranged to alter the setting of potentiometer 203 after every pass. Since the amplified gage indication signal derived from the summation network 65 is arranged to be positive, the signal from potentiometer 203 indicating the desired gage must be negative for proper summation with the gage indication signal within controller 201. A negative power source 207, shown for convenience as a battery, is therefor provided for energization of potentiometer 203. After algebraic summation of the signals within controller 201, which as mentioned supra, is preferably a three function, or multifunction controller, the controller 201 directs a gage error signal via lead 209 to the screw control 19 of rolling stand 11 for control of the screwdown mechanism 17 of stand 11. As the screwdown mechanism is operated the screw position and load cell signals are progressively altered until the system is nulled, or all the signals exactly balanced, causing the gage error signal to disappear. After the disappearance of the gage error signal the correction of the gage by movement of the screwdown mechanism will cease. As is well understood in the art the gage error signal is preferably suitably integrated by integrating means within controller 201 in order to hold the correct setting of the rolling mechanism after the gage error has been corrected.

It may be highly desirable in many installations to provide a recalibration activation control 211 designed to activate console control 169 automatically between passes, without the intervention of the operator through activation of push button switch 173. To this end leads 213, 215 and 217 are directed from the metal detector transmitter leads 153a, 155a and 160a to a recalibration actuation control 211 to provide signals to this control 211 whenever no metal pieces are detected on roller tables 25 and 27 by detectors 149, 151 and 158. A fourth lead 219 is directed from the gage controller 201 to recalibration actuation control 211 to provide a signal to this control if the gage controller is making corrections to the roll setting. A timer 221 is also provided to provide a timed signal to recalibration control 211. When signals are received on leads 213, 215 and 217 by recalibration control 211 indicating the absence of any metal pieces from the vicinity of stand 11 recalibration control 211 will direct an activation signal along lead 223 to console control 169 to activate said console control, providing the switch 225 has previously been closed by the operator. The activation signal along lead 223 will, however, be inhibited or blocked if a signal is being received by recalibration control 211 via lead 219 indicating that controller 201 is altering the roll setting or position of the rolls 13 of mill stand 11. A branch lead 227 of lead 223 directs a portion of the activation signal to timer 221 to initiate the setting of timer 221 for a predetermined fairly long time period such that complete rolling of a metal work piece can normally be accomplished during the predetermined time period. During the timed interval no signal is provided from timer 221 to recalibration control 211 via lead 229 and as a result said control is blocked from initiating a second recalibration activation signal to the console control 169. Upon the expiration of the timed interval a signal is reestablished through lead 229 and a second recalibration cycle can again be initiated by recalibration activation control 211 upon the receipt of signals via leads 213, 215 and 217 indicating that no metal pieces are in the vicinity of the rolling stand. As a safety measure the circuits of recalibration activation control 211 can be set so that a second recalibration signal cannot be directed along lead 223 until a signal series has been received on leads 213 and 215 indicating that metal detectors 149 and 151 have detected a second hot metal piece on the roller tables after an interval in which no metal piece was detected and that the second hot metal piece has likewise subsequently left the vicinity of the rolling stand. Somewhat similar interlock type circuits are shown in U.S. Pat. 3,318,125, issued May 9, 1967, to C. C. Pullen for an interlock system applied to the control of the loopers in a rolling mill.

In order to return the screw position to its original setting after the recalibration cycle has been completed there is provided a track and store unit 233. This unit normally during operation of the mill tracks the signal provided by selsyn 47 representative of the position of the screwdown mechanism 17. The signal from selsyn 47 is directed through lead 47a and branch lead 235 to selsyn 237 which moves the movable contact of potentiometer 239 to provide a signal representative of the screwdown position to track and store unit 233 via lead 241. A branch lead 243 leads from lead 181 to track and store unit 233 so that when screw activator control 165 directs a signal along lead 181 to screw control 19 to initiate facing of the rolls during recalibration, a portion of this signal is directed via branch lead 243 to track and store unit 233 which then ceases tracking the signal from selsyn 237 and merely stores the last determined screwdown position signal received from selsyn 237. When timer 143 opens at the termination of the recalibration cycle it provides a signal along branch leads 183 and 184 to screw activation control 165 which then directs a signal via lead 231 to track and store unit 233 indicating that this unit shall discharge its stored signal via lead 244 through a timer 246 and lead 247 to screw control 19 to return the rolls of the mill to their previous setting. Timer 245 when it opens cuts off the stored signal to screw control 19 after the screw control and screw mechanism have had time to return the rolls to their former position and also directs an actuation signal via lead 249 to track and store unit 233 to direct it to recommence tracking the screw position signal provided by selsyn 247 through potentiometer 239.

Since the signal from the intercept potentiometer 187, the screw position potentiometer 59, the corrected load cell signal from function generator 71 and the signal from the drift potentiometer 193 are all balanced together in summation circuit 65 to provide a null signal when the gage control system of the invention is recalibrated, and since the function generator 71 corrects the load cell signal to provide a direct relationship between the corrected load cell signal and the yield or stretch of the mill, the signal from summation circuit 65 will, so long as the system is perfectly balanced, as it will be after each recalibration, be a null or zero signal at any position of the rolls 13 below face.

It is at times desirable, however, to know just how far below face the rolls are actually positioned. In order to provide this information to the operator, therefore, a subsidiary summation circuit network 251 is provided. This is comprised of a take-off lead 253 from lead 61 to provide a portion of the signal from the screw position potentiometer 59 through resistor 255 to summation circuit 251 and take-off lead 257 from the lead 187a from intercept potentiometer 185 to provide a portion of the negative intercept potentiometer signal through resistor 259 to summation circuit 251. When the operator desires to check the actual position of the rolls 13 below face he can activate push button switch 261 which will apply the signal from summation network 251 through an amplifier 263 to a voltmeter 265 to provide an indication of the actual distance of the rolls below face.

The operation of the gaging and recalibration system will now be described.

Selsyn 47 continuously directs a signal to selsyn 49 representative of the position of the screwdown mechanism 17 and the nominal position of the faces of work rolls 13 with respect to each other. Selsyn 49 through clutch 51, if clutch 51 is engaged, and gear train 53, 55 will position the movable contact 59a of screw position potentiometer 59 to provide a positive signal representative of the nominal position of the faces of work rolls 13 with respect to each other to summation network 65 through resistor 63.

When a strip or plate is entered into the bite of work rolls 13 the rolling load between the rolls is detected by load cell 23 and a signal representative of this load is directed via leads 67 and 69 to function generator 71 which reshapes the load cell signal to provide a substantially straight line or direct relationship between the reshaped load cell signal and the amount of yielding or stretching of the entire mill structure including the mill stand, work and backup rolls, bearings and journals and the other structural parts of the mill due to the rolling load.

The function generator will be preprogrammed to provide the correct biasing or correction of the load cell signal to provide a substantially straight line relationship between the mill yield and the load cell signal. The preprogramming may be accomplished either by running standard metal pieces through the rolls of stand 11 and measuring the load and nominal position of the faces of the work rolls 13 with respect to each other and correlating this against the actual subsequently measured gage of the metal work piece or by bringing the rolls 13 together and somewhat below face.

When standard metal pieces are used for function generator programming the actual gage of the metal piece should show an increase in gage over the nominal gage indicated by the position of the rolls directly related to the load between the rolls. Any discrepancy from a straight line relationship is noted and a correction factor is entered into the programming of the function generator to provide a correction to the load cell signal at the particular detected load to provide a direct relationship over a wide range of possible rolling loads between the load cell signal and the yield of the mill stand.

If the function generator is programmed by running the rolls together the nominal position of the rolls below face as indicated by the screw position is correlated against the actual load cell signal generated at a number of positions below face of the rolls. As the rolls are brought together, a force is developed between the rolls proportional to the force generated by the passage of strip through the mill sufficient to cause a stretch or yielding of the mill stand equal to the amount of travel below face indicated by the screwdown position indicating mechanism. It is, of course, impossible for the rolls of the stand to actually pass through each other, or below face as appears to be indicated by the travel of the screwdown mechanism. Instead the rolls flatten and the mill stand stretches. The force generated between the rolls and detected by the load cell is, however, at least theoretically, the same as that generated by the rolling of a strip between the rolls in which the same degree of yielding of the mill structure occurs. Discrepancies from a straight line relationship between the two factors, yield and load, are noted and recorded for programming the function generator to provide a straight line or direct relationship between the load in the mill, as detected by the load cells, and the yield of the mill structure.

If the rolling mill is to be operated within a fairly restricted range of loads which already occur within a substantially straight line portion of the relationship between the rolling loads and mill yield, it may be necessary only to program function generator 71 to provide a straight line relationship from the initial low loads upon the mill which may occur during recalibration up to the naturally occurring straight line portion of the curve. The initial lower portions of the curve are almost invariably not straight line portions of the load-yield curve because of the effects of bearing, oil film and other mechanical tolerances in the mill and thus this portion of the curve at least must be straightened to enable proper recalibration to take place according to the teachings of the present invention. It is also desirable, of course, that the portions of the curve in which rolling is to take place also be straightened by the function generator if they are not originally straight.

Long term deviations in the signal provided by the summation network 65 through amplifier 137 are compensated for by a compensation signal derived from a manual setting on drift potentiometer 193. If desired some suitable automatic means may be provided to make the correction setting on drift potentiometer 193, particularly if a gage similar to an X-ray gage or the like should be available at least occasionally to check the actual gage of the strip or plate being rolled in the mill.

The signal from function generator 71 may be corrected for the width of the material being rolled either by manual setting of movable contact 89 of potentiometer 87 or preferably by an automatically provided correction factor provided from side guides 33 if side guides are available on the particular mill.

Where side guides are available motor 35 biases the side guide 33 against the strip. When the side guide is tight against the strip the motor load in motor 35 rises and the current to motor 35 is cut off or sharply decreased by controller 37. Meanwhile the position of side guide 33 is monitored by the selsyn transmitter 43 which directs a signal to selsyn receiver and actuator 93 which in turn controls the movement of movable contact 95 of potentiometer 97 to provide a signal representative of the actual position of the side guides relative to each other, and thus the width of the strip, to track and store circuit 99. One or the other of the track and store units 101 or 103 is continuously set to track the signal received from potentiometer 97 while the other track and store unit stores the last signal noted by the unit prior to a command signal from track and store control 105 initiated by manual closing of push button switch 107 by the mill operator. The track and store unit which is storing the last noted signal upon the activation of switch 105 commences to provide a continuous signal representative of the stored signal to function generator 117 which is programmed to select and provide an appropriate multiplication factor signal through lead 119 to multiplier 91 which multiplies the signal from function generator 71 by the provided multiplication factor to adjust the signal from the particular width of the workpiece. In the particular embodiment of controller shown in the figure a double pole switch 81 serves to select whether there shall be manual or automatic selection of the width correction factor.

In order to facilitate recalibration of the gage control system there is provided an intercept potentiometer 185 which provides a constant negative signal to the summation network 65. As will be described presently this signal is completely nulled during recalibration by the remaining signals so that during normal operation a negative signal never occurs. The summated signals of the summation circuit 65 are applied to operational amplifier 137 where they are amplified and then applied through lead 142 to digital voltmeter 139 which indicates the actual opening between rolls 13 of stand 11 and thus the true gage of metal being rolled in the mill. Alternately or concurrently the signal from amplifier 137 may be applied through lead 197 and switch 199, if this switch is closed, to controller 201 which receives a negative signal from potentiometer 203 representative of the gage of strip or plate which it is desired to roll. This signal is summated within controller 201 with the positive signal from amplifier 137 to provide a gage error signal representative of the amount of deviation of the gage of the strip or plate being delivered from the mill from the desired gage or strip. This gage error signal is delivered via lead 209 to the screw control 19 to direct the control of the movement of screwdown mechanism 17.

The three hot metal detector 149, 151 and 158 are designed and located to detect the presence of hot metal on roller tables 25 and 27. These detectors provide signals to transmitters 153, 155 and 160 respectively if hot metal is detected and the transmitters are designed to direct signals along leads 153a, 155a and 160a respectively to the recalibration controls, next to be desecribed, when no metal is detected near the detectors indicating that the mill is clear of metal and safe for recalibration. If metal is detected by any of the detectors 149, 151 or 158 said detector will direct a signal to its associated transmitter which transmitter will then interrupt its signal. As an example, in the figure a metal piece 147 is shown just leaving the mill and temporarily located directly under detector 151 which thus directs a signal to its transmitter 155 which in turn interrupts its normal signal via lead 155a to contacts 163 of the screw activation control 165 and contacts 159 of clutch actuator 129. As a result of this lack of a signal along lead 155a and at contacts 163 and 159 the screw activation control 165 and clutch actuator 129 will be unable to be activated even though a signal is being received by these units from transmitters 153 and 160 indicating that there is no hot metal located adjacent their detectors and even though the gang switch 171 is closed. It will be evident, therefore, that a fail-safe system has also been provided with respect to the transmitters 153, 155 and 160 because if their signal is cut off for any reason, whether from the presence of a signal from their associated detectors, from a failure of the transmitter, or from an opening of gang switch 171, clutch actuator 129 and screw actuation control 165 will be unable to operate.

When now work piece 147 passes from under detector 151, and does not show up under detector 158, the system is designed to assume that the metal piece has permanently left the rolling mill, and, assuming that a new workpiece is not detected under detector 149 entering the mill, signals will be present at contacts 159, 154, 157, 163, 162 and 161 of gang switch 171 and also in leads 213, 215 and 217 to recalibration activation control 211.

If now the operator activates console control 169 by closing pushbutton contacts 173 or, alternatively, if knife switch 225 has previously been closed to connect the recalibration activation control 211 to the activation circuits of console control 169 and the action of recalibration activation control 211 is not blocked by the lack of a signal from timer 221 on lead 229 due to an immediately previous recalibration cycle or a signal on lead 219, an activation signal will be applied, either through switch 173 or via lead 223, to the internal activation circuits of console control 169 which will immediately activate solenoid circuit 170 operating gang switch 171 to close contacts 167, 159, 154, 163, 162 and 161. Upon the closing of contacts 163, 162 and 161 screw activation control 165 will be activated and will direct a signal along lead 181 to screw control 19 which will as a result of this signal operate screwdown mechanism 17 to bring the rolls 13 of stand 11 together.

When the rolls 13 come together load cell 23 will, as soon as any significant load is attained between the rolls, direct a load cell signal along lead 67 and branch lead 177 to load signal detector 175 which is preset to be activated at some predetermined but fairly small load cell signal. When this predetermined load is reached load detector 175 will direct a signal via lead 179 to screw activation control 165 which will then cut off the signal to screw control 19 via lead 181 so that screw control 19 stops the action of screwdown mechanism 17 and the movement of the rolls 13 together is stopped. Because of the momentum developed as the screwdown was operated at high speeds, the load between rolls 13 detected by load cell 23 will continue to increase for a short period even though the activation signal and current have been cut off from screw control 17. Because of the presence of function generator 71, however, the load detected by the load cell and the stretch or yield of the mill remain directly related and it does not matter what the final load, which is reached when all movement ceases, turns out to be.

The signal from load cell 23 is also directed via lead 67 to contact 167 of gang switch 171 and is applied there- through to clutch actuator 129. Clutch actuator 129, as a result of receiving signals through contact 167 from the load cell 23, and signals through contacts 159, 154 and 157 from the hot metal detectors 149, 151 and 158 indicating that the mill is clear, provides a signal in solenoid circuit 127 to disengage clutch 51 and engage clutch 123 whereby the movable contact 59a of screw position potentiometer 59 is connected through mechanical linkage 57 and gear train 133, 55 to servomotor 131 which receives a signal via leads 141 and 144 from summation circuit 65 after said signal has been amplified by amplifier 145. Servomotor 131 will as a result of the signal from summation circuit 65 move the movable contact 59a of potentiometer 59 until all the signals on summation circuit 65 are nulled or exactly balanced against each other to provide a zero signal. Timer 143 is designed to open upon the attainment of a null signal on lead 141, or before the attainment of a null signal, if the timing interval for which timer 143 is preset is exceeded. In either event, upon the opening of the timing circuit of timer 143 the signal from summation circuit 65 is cut off from servomotor 131. Timer 143 also upon the opening of its timing circuit provides a deactivation signal through leads 182 and 183 to console control 169 causing said control to deactivate solenoid circuit 170 to open the various contacts 167, 159, 154, 157, 163, 162 and 161. The opening of the various circuits through these contacts would by themselves deactivate the clutch activator 129 and screw activation control 165, but timer 143, in addition, supplies a direct signal on lead 182 to clutch actuator 129 to cause deactivation of solenoid circuit 127 to disengage clutch 123 and reengage clutch 51. Timer 143 also supplies a direct deactivation signal through lead 182 and branch leads 183 and 184 to screw activation control 165, which, as a result of this signal, directs a backup signal along lead 231 to track and store unit 233. Track and store unit 233, which had previously been tracking the position of the screw mechanism 17 through the action of selsyns 47 and 237 and the varying set point of potentiometer 239 until the track cycle was ended and a storing cycle intiated by the screw actuation signal received via lead 181 and branch lead 243, now, as a result of the backup signal on lead 231 from screw actuation control 165, directs its stored screw position signal, over a timed interval determined by automatically resetting timer 245, via leads 244 and 247 to screw control 19 to cause screw control 19 to actuate screwdown mechanism 17 to return the rolls 13 of rolling stand 11 to their former position prior to the beginning of the recalibration cycle.

The rolls 13 now having been returned to their prior position and clutch 51 being reengaged the mill stand can receive a new workpiece and the gage control system will accurately measure the gage of this workpiece from the zero recalibration point established by the recalibration.

In the gage control system of the invention the rolls are brought during recalibration not just to face but below face far enough so that a load cell signal is received indicating that the rolls are in fact touching. As explained this is much more practical and easier than attempting to determine when the rolls are just barely faced. The fact that the rolls are positioned below face is not detrimental to the recalibration because the function generator 71 has been preprogrammed to provide a direct or straight line relationship between rolling load and mill yield or stretch, or in other words to provide a substantially straight mill modulus curve. The roll force generated by the pressure of the rolls forced against each other is moreover arranged to be exactly cancelled out by the negative signal of the intercept potentiometer 185 when the rolls 13 are theoretically below face, the load signal, of course, being an indication of the amount of mill yield and roll flattening which is occurring below face as a result of the pressure generated by the operation of the screwdown.

During recalibration then the screwdown potentiometer 59 is nulled against the remaining negative signal supplied by the intercept potentiometer 185 which is set to provide a predetermined negative signal greater than the greatest positive signal which will normally be obtained from the load cell 23 during recalibration.

It will readily be seen from the preceding explanation that the gage control system of the invention, as a consequence of the provision of the function generator and intercept potentiometer, can be quickly nulled or recalibrated at any position below face or even at face. If the rolls are forced farther below face after recalibration the zero calibration condition will be maintained with a continuous zero or null condition of the system unless a strip or plate is entered into the rolls of the mill. This zero or faced condition of the rolls will be indicated on digital voltmeter 139. If the position below face of the rolls is desired this can be read on the voltmeter 265. If the rolls are moved apart the digital voltmeter 139 will indicate the distance of the rolls apart as derived from the positive signal of the screw position potentiometer 59.

When strip is passed through the stand 11 while the rolls are positioned above face the load cell signal as corrected by function generator 71 will provide a direct indication of the additional opening between the rolls 13 and thus the additional gage of the strip due to yielding of the mill structure under the rolling load. The same thing will occur if a strip is passed between the rolls 13 while they are positioned at face, except that in this case the load cell signal will indicate the entire gage of the strip, there being in this case no positive screw position signal at all to combine with the load cell signal.

If, on the other hand, the same strip is passed through the rolls while they are positioned below face the load cell signal will be comprised of the load deriving from the spring of the mill forcing the rolls together plus the additional load of the strip passing through the rolls. The spring of the mill is, in effect, a prestressing load and may therefore be subtracted from the total load to determine the additional load provided by the strip. Since the negative screw position supplies a negative signal—through the agency of the negative intercept potentiometer signal—which just cancels out the reshaped load cell signal, this portion of the load is in effect subtracted from the total load and the remaining smaller load indicates directly the smaller stretch of the mill stand and therefore a thinner gage strip. If the rolls are run above the recalibration point but not above actual face and a strip is run through there will be a smaller negative signal balanced against a smaller initial load signal so that the change in signal will be larger and a larger strip will be indicated. A signal proportional to the true gage of the strip will thus be maintained regardless of what position the gagemeter is zeroed at. It will be seen that the use of the function generator, or load cell shaping circuit, allows this result. As mentioned supra if the nominal position of the rolls below face is desired this can be obtained by algebraically summing the roll position signal and the negative intercept potentiometer signal prior to balancing against the load cell signal. Since the nominal position below face is a measure actually of the stretch of the mill, the subtraction of the load cell signal, which is an inverse measure of the stretch of the mill, will provide an accurate indication of this nominal position. The actual position of the screwdown mechanism can also be read with fair accuracy from the mill clock, or mechanical screw position indicator, which is customarily provided on many conventional rolling stands.

The mill control recalibration system of the present invention has proved extremely economical and reliable for use in mill environments and has been found capable of substituting for, and providing better reliability than, very much more elaborate and expense recalibration systems involving the use of X-ray or other radiation gages.

I claim:

1. A zero calibration arrangement for a load cell-screw position type gage determining system associated with a rolling mill stand comprising:
   (i) a pair of work rolls for reducing workpieces passing between the rolls and screwdown means for positioning said work rolls with respect to each other,
   (ii) load cell means to provide a first signal proportional to the separating force between the rolls of said stand,
   (iii) signal generator means associated with said screwdown means to provide a second signal nominally proportional to the relative position of the rolls of the said stand,
   (iv) means to convert said first signal into a third signal proportional to the increased separation between the rolls of the rolling stand due to the yield of the mill under the separating force,
   (v) signal summation means to combine said second signal with said third signal to provide a fourth signal indicative of the actual relative position of the rolls in the rolling stand when strip is passing through said rolling stand, and incorporating improvements comprising:
   (a) function generator means to convert said first signal prior to its application to said signal combining means of (v) above into a signal having a straight-line relationship with and directly proportional to the yield of the mill components due to the separating force between the rolls of said rolling stand over ranges extending beyond the substantially straightline portions of the mill modulus curve for the said rolling mill stand at least from a condition of no load between said rolls to said straightline portions of said mill modulus curve,
   (b) first control means to initiate screwdown of said rolls of said rolling stand at spaced intervals between workpieces passing through said rolling stand,
   (c) second control means to activate a signal generator means through from said load cell means of (ii) signal is received from said load cell means of (ii) to provide a recalibration signal to null the signal from the summation means of (v) above,
   (d) means to apply said signal from said summation means of (v) above to said servomotor means to drive said servomotor means and null said signal from said summation means through adjustment of said signal generator means,
   (e) second signal generator means to provide a signal having a predetermined polarity opposite to said second and third signals above and apply it to said summation means of (v) above.

2. A zero calibration arrangement for a load cell-screw position type gage determining system associated with a rolling mill stand according to claim 1 wherein said second control means after activation of said first control means activates a signal generator by dissociating the signal generator means of (iii) from the said screwdown means on said rolling stand and connects it to said servomotor means when a load cell signal is received by said second control means from said load cell means of (ii), and
   (f) control means to reassociate said signal generator means of (iii) with said screwdown means and disconnect it from said servomotor means upon a null signal being obtained in order to prepare said gagemeter system for further detection of the gage of strip passing through said rolling stand.

3. A zero calibration arrangement for a load cell-screw position type gage determining system associated with a rolling mill stand according to claim 1 additionally comprising:
   (f) drift signal means to provide a drift signal to said combining means of (v) to additionally calibrate said gagemeter to conform to an externally detected gage reading of said strip.

4. A zero calibration arrangement for a load cell-screw position type gage determining system associated with a rolling mill stand according to claim 3 additionally comprising:

(g) signal means to indicate when a strip has left the rolling stand and no new strip will be entered into said stand for a predetermined period, (h) said first control means of (b) being adapted to initiate screwdown of the rolls of said rolling stand at spaced intervals between workpieces passing through said rolling stand only when said signal means of (g) indicates that the rolling stand is clear of strip.

5. A zero calibration arrangement for a load cell-screw position type gage determining system associated with a rolling mill stand according to claim 4 additionally comprising:

(j) with detecting means to provide a fifth signal proportional to the width of material being rolled, (k) means to convert said fifth signal into a sixth signal representative of the departure of said mill modulus curve for said particular width from a standard mill modulus curve for said rolling stand and apply said sixth signal to said signal summation means of (v) of claim 1 as a correction factor for width.

6. A zero calibration arrangement for a load cell-screw position type gage determining system associated with a rolling mill stand according to claim 5 wherein said rolling mill stand is a stand of a reversing mill.

7. A zero calibration arrangement for a load cell-screw position type gage determining system associated with a rolling mill stand according to claim 6 additionally comprising:

(l) summing means to sum the second signal from the signal generator means of (iii) with the opposite polarity signal from said second signal generator means of (e) and apply said summed signal to an indicating gage means to provide an indication of the nominal position of the rolls of the mill below face.

8. A zero calibration arrangement for a load cell-screw position type gage determining system associated with a rolling mill stand comprising:

(i) a pair of work rolls for reducing workpieces passing between the rolls and screwdown means for positioning said work rolls with respect to each other, (ii) load cell means to provide a first signal proportional to the separating force between the rolls of said stand, (iii) signal generator means associated with said screwdown means to provide a second signal nominally proportional to the relative position of the rolls of the said stand, (iv) means to convert said first signal into a third signal proportional to the increased separation between the rolls of the rolling stand due to the yield of the mill under the separating force, (v) signal summation means to combine said second signal with said third signal to provide a fourth signal indicative of the actual relative roll positions in the rolling stand when strip is passing through said rolling stand, and incorporating improvements comprising:

(a) function generator means to convert said first signal prior to its application to said signal combining means of (v) above into a signal having a straightline relationship with and directly proportional to the yield of the mill components due to the separating force between the rolls of said rolling stand over ranges extending beyond the substantially straightline portions of the mill modulus curve for the said rolling mill stand at least from a condition of no load between said rolls to said straightline portions of said mill modulus curve, (b) adjustable signal generator means to provide a signal to said signal summation means of (v) to null the effective output of said signal summation means, (c) feedback means to apply the signal of said signal summation means to said adjustable signal generator means at appropriate predetermined times when the rolls of said rolling mill stand are in contact with each other to adjust said signal generator means to provide an appropriate signal to null the effective output of said signal summation means.

9. A zero calibration arrangement according to claim 8 additionally comprising:

(d) control means to bring the rolls of said rolling stand together between rolling passes and stop them when a signal is detected from said load cell means of (ii) and to initiate adjustment of said adjustable signal generator means while said rolls are stationary and in contact with each other.

10. A zero calibration arrangement according to claim 9 additionally comprsing:

(e) control means to determine the completion of calibration and raise the rolls of said mill.

11. A zero calibration arrangement according to claim 10 wherein said adjustable signal generator means is the means of (iii) above and additionally comprising:

(f) control means to temporarily disconnect said adjustable signal generator means from association with said screwdown means and associate it with said feedback means of (c) to apply the signal of said signal summation means to said adjustable signal generator means to null said signal summation means.

12. A method of quickly recalibrating a load cell-screw position system for indicating the gage of strip passing through a reversing rolling mill stand comprising:

(a) determining the mill modulus curve for said mill stand, (b) determining a series of correction factors for said mill modulus curve to provide a straightline relationship of said curve with respect to the mill load versus the yield of said mill when loaded extending at least from a condition of no load to an inherently straightline portion of said mill modulus curve which correction factors are applied as correction signals by function generator means to load cell signals derived from load cells arranged to measure the load between the rolls of said reversing mill, (c) providing a predetermined signal of opposite polarity from said load cell signal and a screw position signal from said mill screwdown, (d) when the rolls of said mill are empty bringing said rolls down to an undetermined position below face whereby a load of undetermined degree is indicated between the rolls, and (e) nulling the remaining signal of (c) with a signal of opposite polarity, which signal is subsequently continued undiminished during subsequent rolling until a new recalibration is made, by applying the combined load cell, screw position and predetermned signals to a servomotor operating a null signal generating means.

References Cited

UNITED STATES PATENTS

| | | | |
|---|---|---|---|
| 3,204,440 | 9/1965 | Thompson | 72—8 |
| 3,253,438 | 5/1966 | Stringer | 72—12 |
| 3,332,263 | 7/1967 | Beadle et al. | 72—7 |
| 3,416,339 | 12/1968 | List | 72—8 |
| 3,128,630 | 4/1964 | Briggs | 72—8 |
| 3,248,916 | 5/1966 | Kenyon et al. | 72—8 |
| 3,387,470 | 6/1968 | Smith, Jr. | 72—8 |

MILTON S. MEHR, Primary Examiner

U.S. Cl. X.R.

72—14, 19, 21